CRYOTRON ASSOCIATIVE MEMORY

Filed March 1, 1962 5 Sheets-Sheet 1

INVENTOR.
HARVEY ROSENBERG

BY Charles R. Lepchinsky
ATTORNEY

Feb. 15, 1966 H. ROSENBERG 3,235,839

CRYOTRON ASSOCIATIVE MEMORY

Filed March 1, 1962 5 Sheets-Sheet 2

INVENTOR.
HARVEY ROSENBERG

BY Charles R. Lepchinsky
ATTORNEY

Feb. 15, 1966 H. ROSENBERG 3,235,839

CRYOTRON ASSOCIATIVE MEMORY

Filed March 1, 1962 5 Sheets-Sheet 3

INVENTOR.
HARVEY ROSENBERG
BY
Charles R. Lepchinsky
ATTORNEY

INVENTOR.
HARVEY ROSENBERG
BY
Charles R. Lepchinsky
ATTORNEY

Feb. 15, 1966 H. ROSENBERG 3,235,839

CRYOTRON ASSOCIATIVE MEMORY

Filed March 1, 1962 5 Sheets-Sheet 5

*INVENTOR.*
HARVEY ROSENBERG

*BY*
Charles R. Lepchinsky
ATTORNEY

United States Patent Office 3,235,839
Patented Feb. 15, 1966

3,235,839

CRYOTRON ASSOCIATIVE MEMORY

Harvey Rosenberg, Drexel Hill, Pa., assignor to Burroughs Corporation, Detroit, Mich., a corporation of Michigan Filed Mar. 1, 1962, Ser. No. 176,519
16 Claims. (Cl. 340—146.2)

This invention relates to an associative memory and more particularly to an associative memory composed of thin film superconducting elements.

The cryotron is a relatively new development in the computer art which utilizes the superconductive characteristics of certain metals at very low temperatures. In the absence of a magnetic field, superconducting materials suddenly change from a resistive state into a superconducting state, in which their resistance is substantially zero below a certain critical temperature. A magnetic field applied to a superconductor will lower the temperature at which the material will change from a resistive to a non-resistive element, i.e., a magnetic field causes the normal transition temperature to move to a lower value. Conversely, if the superconducting material is held at a constant temperature, a magnetic field of sufficient density will cause the superconductor to change from its zero resistance or superconducting state into its normal resistive state.

A thin film cryotron utilizes these properties of superconducting materials and is similar to a relay in that it is a four-terminal device, with no electrical connection between the control element and the gate element. The control film portion of a cryotron always remains superconducting but the gate film portion can be made normal (i.e., changed from the zero resistance or superconducting state into the resistive state) when the control current flowing through the control film reaches a critical value. When the control current reaches this critical value it generates a magnetic field of sufficient density to cause the superconducting gate film to go normal (i.e., become resistive).

Even though cryotron circuits must be refrigerated to very low temperatures, they have many advantages such as low power consumption, little or no noise, high operating speeds, economical fabrication, occupy little space and are light weight, etc., so that it can reasonably be expected that they will gain wide acceptance in the computer art.

An associative memory basically is a comparing device wherein a test or key word is concurrently compared with all of the words previously stored in the memory. A typical magnetic core associative memory is described in U.S. Patent 2,973,508 entitled, "Comparator." The present invention utilizes superconducting elements such as cryotrons to form a complete associative memory.

Accordingly an object of this invention is to provide a superconducting associative memory.

Another object of this invention is to provide an associative memory wherein there is no loss of stored information when a temporary failure of operating potential occurs.

A further object of this invention is to provide an associative memory having little or no noise signals.

Still another object of this invention is to improve associative memories.

In accordance with a feature of this invention, once a word location in the memory is filled, an "occupied" indication is established at that location so that on the next write operation the "occupied" locations are by-passed and the new word will find the first unoccupied or empty position.

In accordance with another feature of this invention the memory is searched in a parallel mode to determine if one or more word or data locations match the key or test input; a "match location" register is provided which stores the position of the matched locations which then can be read out sequentially.

The foregoing and other objects and features of this invention will be best understood by reference to the following description of an embodiment of the invention taken in conjunction with the accompanying drawings, wherein.

Figure 4A:
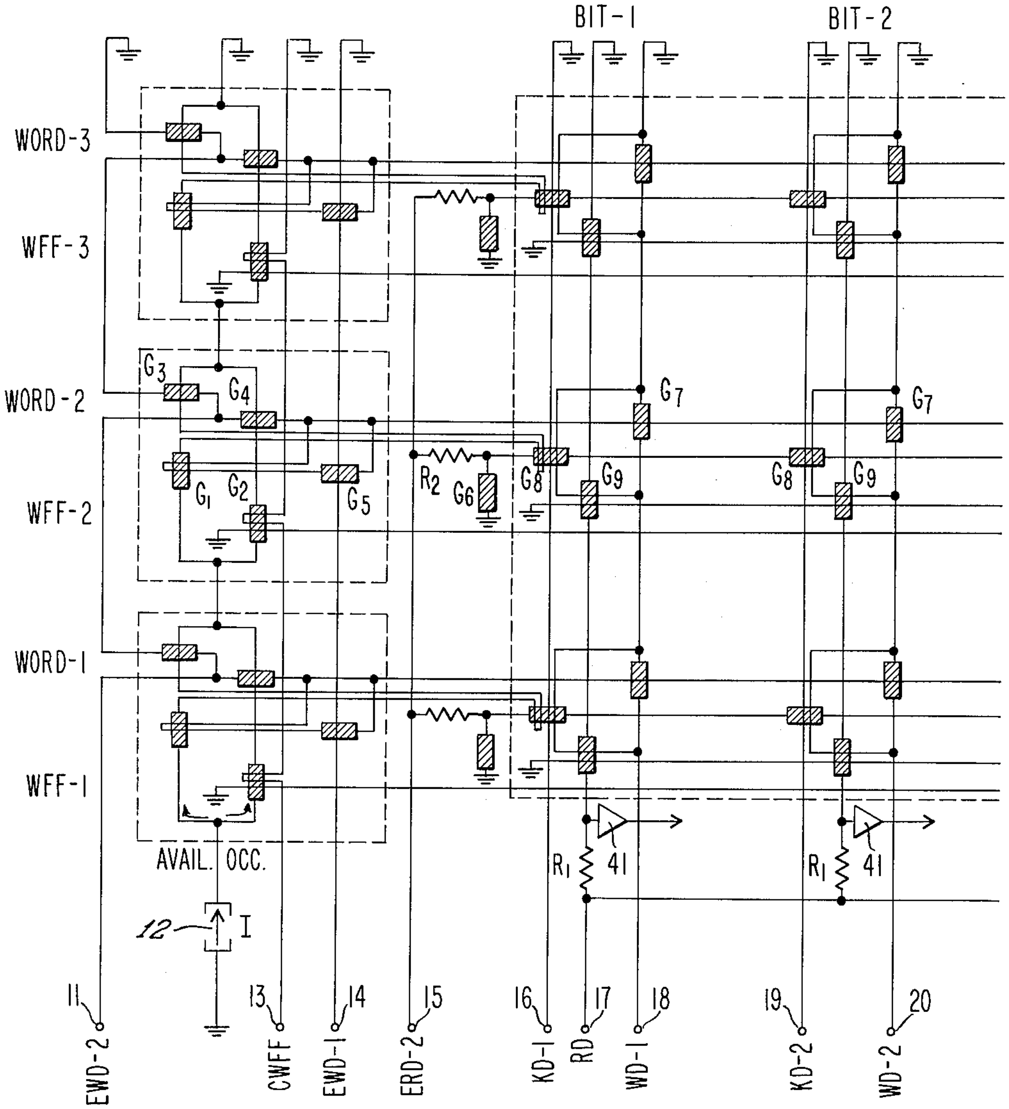
Figure 4:
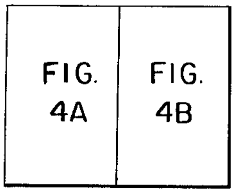
Figure 4B:
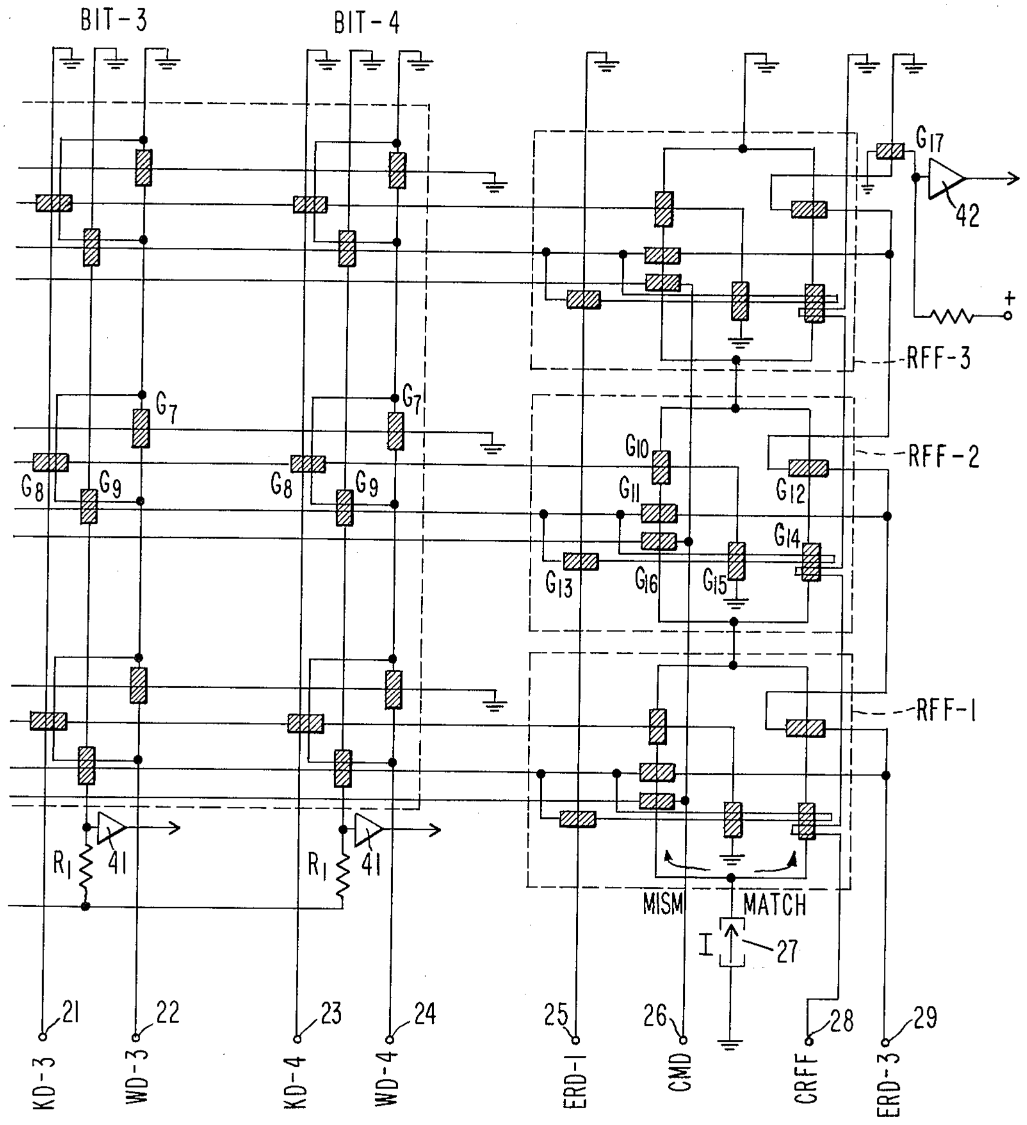

FIGURES 4A and 4B taken together constitute a schematic diagram of a preferred embodiment of the present invention;

FIGURES 5A, 5B, 5C and 5D are timing diagrams for various operations performed by the preferred embodiment of this invention shown in FIGURES 4A and 4B.

*Basic memory cell*

Figure 1:
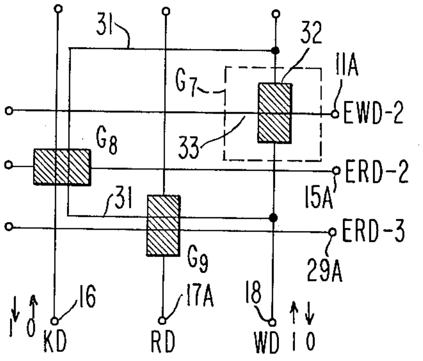
FIGURE 1 is a schematic diagram of a memory cell utilized in the present invention.

Referring now to the drawings, like reference characters designate like or corresponding parts throughout the several views, there is shown in FIGURE 1 a complete associative memory cell comprising three superconducting gates such as thin film cryotrons G7, G8 and G9 each having a gate element 32 at least one control element 33, and a persistent current loop comprising lead 31 and the write cryotron G7. For purposes of clarity these elements are given reference characters for the cryotron G7 only. It being understood that all the cryotrons hereinafter discussed have the same or substantially the same elements. In order to write information into the memory cell, an enable write pulse EWD–2 is applied to terminal 11A which causes a current to flow through the control 33 of the write cryotron G7. This current, hereinafter called "critical" current, creates a magnetic field of sufficient density to cause the superconducting gate portion 32 of the write cryotron G7 to enter its resistive state, hereinafter called "normal" state.

After the write cryotron G7 has been rendered normal, a write pulse WD is applied to terminal 18 which causes current to flow through the superconducting lead 31. No current flows through the write cryotron G7 because it is normal. Once the write WD current is established the enable write pulse EWD–2 can be removed and the write cryotron G7 (hereinafter called cryotron G7) will again become superconducting. Even though the cryotron G7 is now superconducting, none of the write pulse current will flow through the cryotron G7 because there can be no change in flux linkages, i.e., the net flux linkage remain constant in a closed superconducting loop. After the enable write pulse EWD–2 is terminated, the write pulse WD is terminated. Since no change in flux linkages can occur, the flux caused by the write pulse is trapped in the closed superconducting loop comprising the lead 31 and the cryotron G7, causing a persistent or circulating current having a magnitude of approximately ½ critical that flows around the closed superconducting loop. The magnitude of the persistent current is determined by the circuit geometry and the write current WD.

Reference to FIGURE 1 shows that if the write WD pulse causes a current to flow into the terminal 18, a clockwise persistent current will result, and if the write pulse causes a current to flow out of terminal 18 a counter clockwise persistent current will result. For the purposes of describing the present invention a "one" stored in the memory cell will be defined as a clockwise persistent current and a "zero" stored in the memory cell will be defined as a counterclockwise persistent current. It will be clear to those skilled in the art that the absence of any persistent current could also define a "zero" and that persistent current can define a "one" or vice versa. For a more detailed description of the physical and electrical properties of thin film cryotrons and the use of persistent currents for storage see "Thin-Film Cryotron Catalog Memory" by A. E. Slade and C. R. Smallman appearing in Solid-State Electronics 1960 volume 1, No. 4, pages 357–362.

It is important to note here that application and removal of the write DW pulses, without applying the enable write pulse EWD–2, will have no effect on the existing persistent current in a cell. This is true so long as the combined currents do not exceed the critical current density for the superconductors. This prevents self quenching which occurs when the external magnetic field due to the current in a superconductor is sufficient in itself to cause the superconductor to go normal.

After the information is stored in the memory cells, it is necessary to be able to locate certain desired words or stored data and read out the stored information. Referring to FIGURE 1 which shows a single memory cell, assume a "one" (clockwise persistent current) is stored in the cell and that a key KD or test pulse is applied to terminal 16 causing current to flow from the terminal. For the purpose of describing this invention, current flowing out of the terminal 16 is defined as a "one" and current flowing into the terminal 16 is defined as a "zero." The magnitude of the key KD pulse current is equal to the critical current of the sensing cryotron G8. The magnitude of the persistent currents in the memory cells are approximately ½ critical. The key KD "one" pulse current flowing out of terminal 16 would ordinarily switch the sensing cryotron G8 into its normal state. However, the magnetic field due to the stored "one" clockwise persistent current in the cell opposes the effect of the key KD "one" current. Also, the key "one" current induces a current into the persistent current loop of a magnitude of ½ critical which aids the "one" persistent current already in the loop. Accordingly, when a "one" is stored in the cell and a "one" key input is applied to the terminal 16, the magnetic fields created by the key KD current, the stored persistent current, and the current induced in the persistent current loop cancel each other and the sensing cryotron G8 remains superconducting. The magnitude of the current induced into the persistent current loop by the key KD pulse current is determined by the relative geometry of the memory cell.

It is clear that if the key KD pulse was a "zero" (current into terminal 16) and a "one" persistent current existed in the cell, the current induced into the persistent current cell by the "zero" key KD pulse would oppose and cancel the effect of the "one" persistent current already in the cell, thereby enabling the magnetic field produced by the key KD pulse to render the sensing cryotron G8 (hereinafter called cryotron G8) normal.

Accordingly, when the key KD input matches the stored persistent current, the net control current on the cryotron G8 is substantially zero and the cryotron remains superconducting. In the case of a mismatch, the net control current on the cryotron G8 is at least equal to the critical value which causes the cryotron G8 to go normal. Therefore, when an enable read pulse ERD–2 is applied by way of terminal 15A to all of the keyed bits (those to which the key KD input is applied) in series in a particular word location, a mismatch in any bit position (there being a memory cell for each bit position) inserts a resistance in the path of the enable read pulse ERD–2, and if all of the keyed bits match, the enable read pulse ERD–2 finds a continuous superconducting path through the serially connected G8 cryotron which comprise a word location.

Notice that if the key pulse KD is not applied to a particular bit, then the enable read pulse ERD–2 will pass unimpeded through that particular bit position because the cryotron G8 control current cannot exceed ½ critical current, the magnitude of the persistent current in the memory cell. This is called "masking" a bit, thus making it a "don't care" condition.

The enable read pulse ERD–2 is applied to all word locations in the complete memory (each word having a memory cell for each of its bit positions) in parallel and the absence of resistance in a path through a complete word indicates a match has been found between the key KD inputs and a word in the memory. If more than one match occurs, provision for storing their locations and subsequential read-out is provided as is discussed hereinafter.

Once a matched word location is found the information is read out of the memory cells comprising the bit positions of the matched word location. Referring again to FIGURE 1 which shows an individual bit or memory cell, an enable read pulse ERD–3 is applied to the terminal 29A causing a current to pass through the control of read-out cryotron G9 of each bit position of the matched word.

The current created by the enable read pulse ERD–3 induces a current into the persistent current loop that either aids or opposes the stored "one" or "zero" persistent current in the persistent current loop, thereby causing the read-out cryotron G9 to go normal or remain superconducting. For the purposes of explaining this invention the enable read pulse ERD–3 will be assumed to cause a current to flow into terminal 29A. Therefore, according to the principles discussed above, if a "zero" is stored in a memory cell when the third enable read pulse is applied to terminal 29A, the net control current of cryotron G9 is substantially zero and the read-out cryotron G9 remains superconducting. Conversely, if a "one" is stored in a memory cell the net control current of the read-out cryotron G9 (hereinafter called cryotron G9) is equal to the critical value and the cryotron becomes normal. A read RD pulse is then applied to terminal 17A and a "one" is read out if the cryotron G9 is normal and a "zero" is read out if the cryotron G9 is superconducting. A more detailed description of how the read out pulses indicative of a "one" or "zero" are obtained is described hereinafter.

*Write flip-flop*

Figure 2:
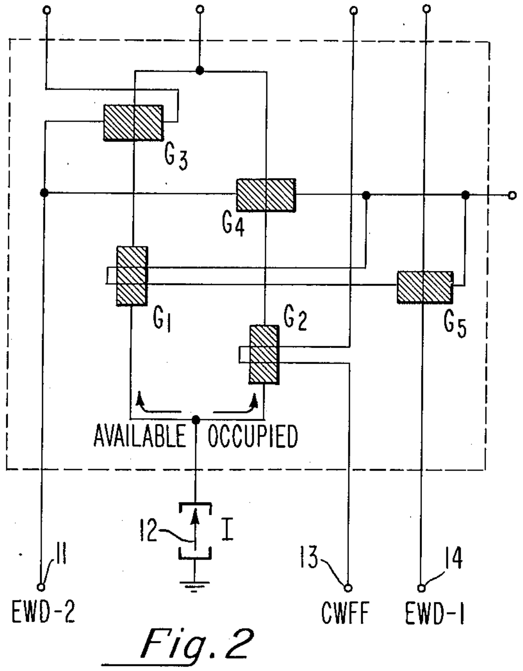
FIGURE 2 is a schematic diagram of a write flip-flop utilized in the present invention.

FIGURE 2 shows, within the dotted outline a cryotron flip-flop used in a preferred embodiment of the present invention for each word location of the memory as a write register flip-flop. Reference to FIGURE 2 shows that the write flip-flop has two parallel current paths; an "available" path through cryotron G1 and an "occupied" path through cryotron G2. Assume there is no current through either of the parallel cryotron paths. All parts of the circuit are superconducting and the magnetic flux through the loop is zero. Assume the D.C. current source 12 is turned on, sending a current through the line supplying the two parallel paths. If the loop formed by the two parallel paths is symmetrical, the current will divide equally between the two branches; in this way the magnetic field set up in the loop by one branch exactly cancels the field set up by the other, keeping the net flux equal to zero. Note, that even if the two paths are not symmetrical, the current will still divide in a manner which satisfies the condition of no flux change through a closed superconducting loop. When a current is applied to the terminal 13 causing the cryotron G2 to go normal, the current that had been carried by the right side of the loop switches to the other side which is still superconducting. With all the current flowing through the left-hand branch, there is now a net field through the loop. The flux has changed but only because superconductivity has been destroyed in one side of the loop. When the current is removed from the terminal 13, the right-hand branch again becomes superconducting, and the flux through the loop is trapped. This means that all the D.C. current supplied by source 12 must continue to flow through the left-hand-side; for if it were to divide in any way, the net flux would not remain constant. The only way to change the pattern is to actuate the left-hand cryotron G1 by causing it to become normal and thereby flipping the current to the right-hand side.

Initially, a clear write flip-flop pulse CWFF is applied to terminal 13 which directs the D.C. current from source 12 through the cryotron G1 or the "available" state of the write flip-flop. This current will cause the cryotron G3 to go normal and the clear pulse CWFF can then be terminated.

When an enable write pulse EWD–2 is applied to the terminal 11, the pulse is diverted through the cryotron G4, since cryotron G3 is normal, which subsequently enables information to be written into the bits (memory cells) of the corresponding word location. If the flip-flop had been in the "occupied" state, the enable write pulse EWD–2 would have passed through the cryotron G3, because the cryotron G4 would have been set into the normal state by the current in the "occupied" side of the flip-flop, thus bypassing this word location and proceeding to the first "available" write flip-flop.

Provision is made to set the write flip-flop to the occupied state immediately after it is used to write in a new word or data. The enable write pulse EWD–1 applied to terminal 14 blocks (causes to go normal) the cryotron G5, which damps out any persistent current which may have existed in the cryotron G5 loop by inserting the resistance of cryotron G5 in the loop. The enable write pulse EWD–2 is then applied which enables the write operation as described above. When the enable write current EWD–2 is established, the enable write current EWD–1 is removed but the enable write current EWD–2 continues to bypass the cryotron G5 path since the net flux linkages due to the enable write pulse EWD–2 current remain constant in the cryotron G5 loop, preventing any redistribution of current. Finally, the enable write EWD–2 is removed; and just as in the persistent current memory cell, a persistent current is induced around the cryotron G5 loop. This persistent current is designed to have a magnitude capable of making cryotron G1 go normal which in turn sets the write flip-flop to the "occupied" state. In using this arrangement, the need for some sort of delay means per word location is eliminated together with its associated time race considerations and added complexity.

*Read flip-flop*

Figure 3:
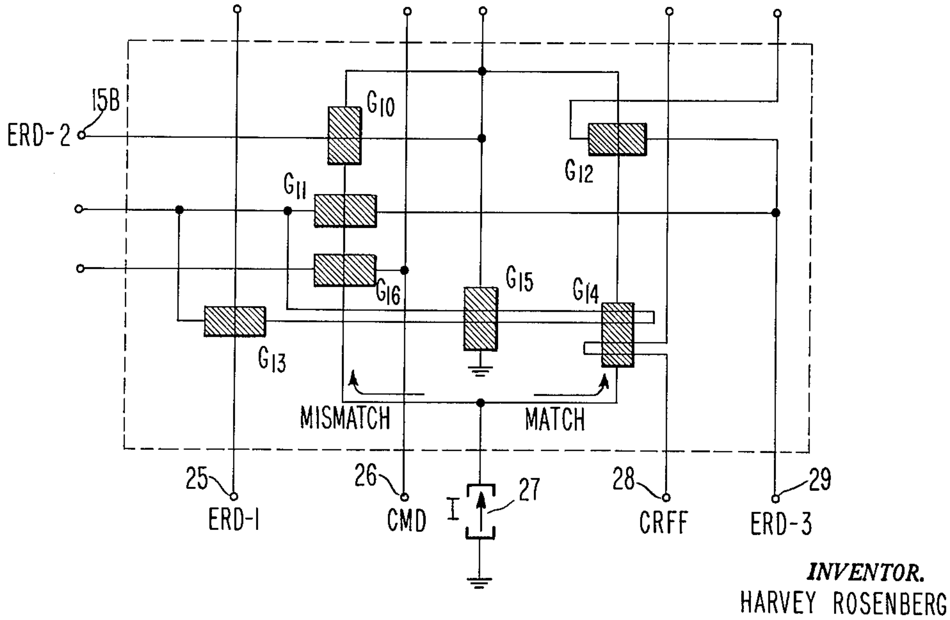
FIGURE 3 is a schematic diagram of a read flip-flop utilized in the present invention.

FIGURE 3 shows within the dotted outline a cryotron flip-flop used in a preferred embodiment of the present invention for each word location of the memory as a read or match register flip-flop. From a perusal of FIGURE 3, it can be seen that the flip-flop is similar to the write flip-flop in that the read flip-flop contains two parallel paths comprising the cryotrons G10 and G14 respectively, and a persistent current loop including the cryotron G13.

Initially a clear read flip-flop pulse CRFF is applied to terminal 28 which directs the current from the D.C. source 27 through the cryotron G10 or the "mismatch" state of the read flip-flop. This mismatch current causes the cryotrons G11 and G16 to go normal. Subsequently an enable read pulse ERD–1 is applied to terminal 25 which blocks the cryotron G13 and damps out any persistent currents which may have existed in the cryotron G13 loop. As will be explained hereinafter in connection with the description of the complete cryotron associative memory, when there is a match between the key input word and word or words in the memory, the enable read pulse ERD–2 will be applied to terminal 15B of the read flip-flops associated with the matched word locations. The enable read pulse ERD–2 current blocks cryotron G10 causing the flip-flop current to be switched from the "mismatch" side to the "match" side. This is possible because prior to the occurrence of the enable read pulse ERD–2, the clear read flip-flop CRFF pulse is removed causing the cryotron G14 to become superconducting. The current being in the "match" side of the read flip-flop causes the cryotron G12 to go normal.

An enable read pulse ERD–3 is then applied to terminal 29 and is diverted through the cryotron G11, since the cryotron G12 is normal, which subsequently enables the corresponding "matched" word location in the memory to be read-out. If the read flip-flop had been in the "mismatch" state, the enable read pulse ERD–3 would have passed through the cryotron G12 because the cryotron G11 would be in the normal state, thus bypassing this word location and proceeding to the first "match" location.

Provision is made to set the read flip-flop to the "mismatch" state immediately after it is used to read-out a "matched" word location in the memory. ERD–1 is now removed and subsequently the enable read pulse ERD–3 is removed, and just as in the persistent current memory cell and write flip-flop, a persistent current is induced in the cryotron G13 loop. This persistent current is designed to have a magnitude capable of making the cryotron G14 go normal which in turn sets the read flip-flop into the "mismatch" state.

These and other operations of the read flip-flop will be more clearly understood from the description given hereinafter of the complete cryotron associative memory.

It should be noted here that with the exception of losing the refrigeration, the information stored in the read and write flip-flops and the memory cells is nonvolatile. That is, if the D.C. current sources fail, a persistent current sets itself up in each flip-flop and memory cell to maintain the same flux linkages present before the power failure. Upon restoring the power the memory returns to the identical conditions existing before the failure.

*The complete cryotron memory*

Referring now to FIGURES 4A and 4B, which taken together comprise FIGURE 4 and which shows the complete cryotron associative memory. There is shown a three word memory WORD–1, WORD–2 and WORD–3, the words being arranged in a vertical stack and each word having four bit positions. That is, a memory cell matrix made up of bit columns and word rows. A complete memory cell, such as that shown in FIGURE 1 is provided for each bit position. It is to be understood that the present invention is not limited to this number of words and bits, for any number of words and bits can be used in accordance with the teachings of this invention. Reference to FIGURE 4 also shows that there is a write flip-flop WFF and a read flip-flop RFF associated with each word location of the memory.

For purposes of clarity, reference characters are given for the cryotrons of one complete word location only. It is to be understood that the same reference characters will be used in describing the function of the corresponding cryotrons of the other word locations.

*Clearing the memory*

Figure 5A:
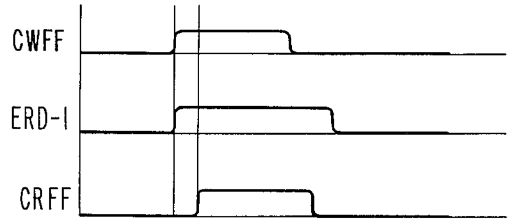
Figure 5B:
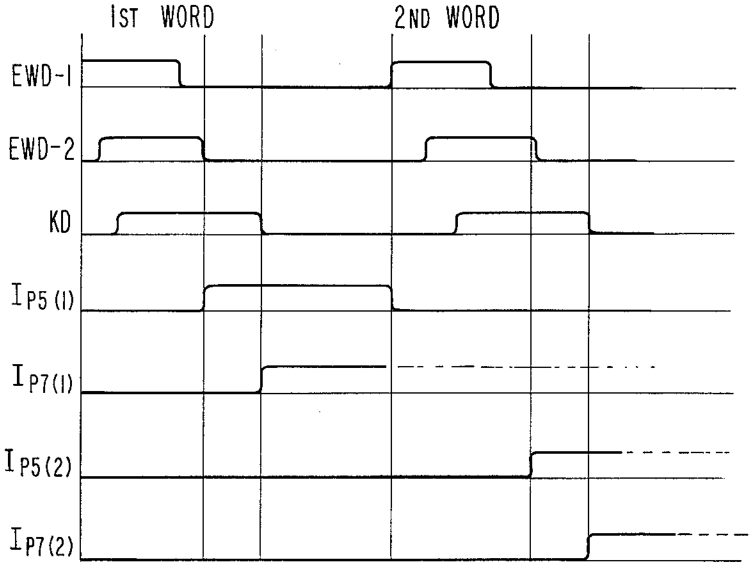

Referring now to FIGURE 4 and also to FIGURE 5A which is the "clear memory" timing diagram; the memory is cleared by applying a clear write flip-flop pulse CWFF to terminal 13 which blocks (causes to go normal) the G2 cryotrons all the write flip-flops WFF, causing them to enter the "available" state. At the same time a first enable read pulse ERD–1 is applied to terminal 25 which blocks all of the G13 cryotrons in the read flip-flops RFF and thereby damps out any persistent currents that may exist in any of the cryotron G13 loops. After all of the G13 cryotrons are blocked, a "clear read flip-flops" pulse CRFF is applied to terminal 28 blocking all of the G14 cryotrons causing all of the read flip-flops to enter the "mismatch" state.

As will be shown below, any information stored in the memory cells is destroyed when new information is written into them.

*Writing into the memory*

Once the memory is cleared, new informtion may be written into the memory. Referring again to FIGURE 4, and to FIGURE 5B which is a timing diagram for writing information into the memory it is seen that in order to write information into the memory a first enable write pulse EWD–1 is applied to terminal 14 which blocks all of the G5 cryotrons in the write flip-flops and damps out any persistent currents which may exist in the G5 cryotron loops.

A second enable write pulse EWD–2 is then applied to terminal 11. Since all of the write flip-flops are in the "available" state due to the clearing operation thereby causing all the G3 cryotrons to be blocked, the second enable write pulse EWD–2 will pass through the cryotron G4 of the first write flip-flop WFF–1 and go on to block the G7 cryotrons of all the memory cells comprising the bits of the first word location. Blocking of the G7 cryotrons will damp out any persistent currents existing in the memory cells that are indicative of information previously stored.

Next, the information to be stored in the memory is entered into the memory cells (bits) of the first word location simultaneously, i.e., the bits of the word enter the memory in parallel. The first bit WD–1 is applied to terminal 18, the second bit WD–2 is applied to terminal 20, the third bit WD–3 to terminal 22, etc. The bit pulses, WD–1 to WD–4, will set up persistent currents in their respective memory cells in the first available word location which are indicative of "one's" or "zero's" in a manner as described in conjunction with the memory cell shown in FIGURE 1. As is well known to those skilled in the art, the bits of the word to be stored in the memory can be supplied by a variety of means such as a manual keyboard, an electronic register etc.

After the new information or word is stored in the memory the first enable write pulse EWD–1 applied to terminal 14 is terminated, causing all of the G5 cryotrons of the write flip-flops WFF to become superconducting again. Then the second enable write EWD–2 is terminated which causes a persistent current $I_{p5}$ (1) FIGURE 5B to be induced in the cryotron G5 loop of the write flip-flop WFF–1 associated with the word location into which new information has just been written. This persistent current blocks the cryotron G1 of the write flip-flop WFF–1 causing the flip-flop to enter the "occupied" state. Lastly, the bit pulses WD–1 to WD–4 are terminated setting up the persistent current $I_{p7}$ (1) FIGURE 5B in the memory cells associated with the first available word position.

In order to write the second word into the memory, the first enable write pulse EWD–1 is again applied to terminal 14 which blocks all of the G5 cryotrons of all the write flip-flops. Notice that this will damp out the persistent current in the cryotron G5 loop of the first write flip-flop WFF–1 which was established when the second enable write pulse EWD–2 was terminated during the writing in of the first new word. There being no persistent current in the cryotron G5 loop of the first write flip-flop, WFF–1 will enable the cryotron G1 of the first write flip-flop to become superconducting. However, since there can be no net flux change, the current in the first write flip-flop WFF–1 will remain in the "occupied" side of the flip-flop.

Next, the second write pulse EWD–2 is again applied to terminal 11. Because the first write flip-flop WFF–1 is in the "occupied" state, its cryotron G4 will be normal and will block the passage of the second enable write pulse. Therefore the second enable write pulse EWD–2 is passed by the cryotron G3 of the first write flip-flop WFF–1, i.e., it bypasses the "occupied" write flip-flop and seeks the first write flip-flop which is in the "available" state, which in this case is the second write flip-flop WFF–2. The second enable write pulse passes through the cryotron G4 of the second write flip-flop and then causes the G7 cryotrons of the memory cells associated with the second word location to go normal. The new information or word is then written into the second word location as described above. As mentioned previously, the second subsequent applications of the write bits WD will not disturb the persistent current existing in the bits (memory cells) of the word or data locations previously written into.

The write cycle is repeated until the memory is filled or all of the necessary information is stored in the memory. Notice that if no information is written into a word location its associated write flip-flop will remain in the "available" state. Reference to FIGURE 4A shows that the current flowing through the "available" side of a write flip-flop also blocks the G8 cryotron of the memory cell comprising the first bit of the word location associated with that write flip-flop. As will be shown below, this prevents a match condition to exist at an empty word location during a read operation.

*Reading out the memory*

In order to read out of the memory the key bits KD–1, KD–2, KD–3, KD–4, etc., of the particular word or data to be found in the memory are applied to the terminals 16, 19, 21, 23, etc., respectively. The key bits KD may be derived from a manual keyboard or an electronic key register. The method of searching for a match between a key KD input and the contents of a memory cell, such as a persistent current memory cell, has been explained previously in conjunction with FIGURE 1. Accordingly, the cryotron G8 associated with a particular bit position of the stored words or data will remain superconducting if the associated key KD input current direction opposes the flux produced by the stored persistent current (indicating a match in that particular bit). Since the bits of a single word or data location have their G8 cryotrons connected in series, when a match occurs between the key KD inputs and the data or word position in the memory, all of the G8 cryotrons in the matched word or data location will be superconducting and will show no electrical resistance to an interrogation pulse such as the second enable read pulse ERD–2. Conversely, when there is a mismatch between the key KD inputs and a word or data location in the memory, one or more of the G8 cryotrons in the bits (memory cells) comprising the mismatched location will be normal, i.e., resistive, thereby presenting electrical resistance to an interrogation pulse.

Figure 5C:
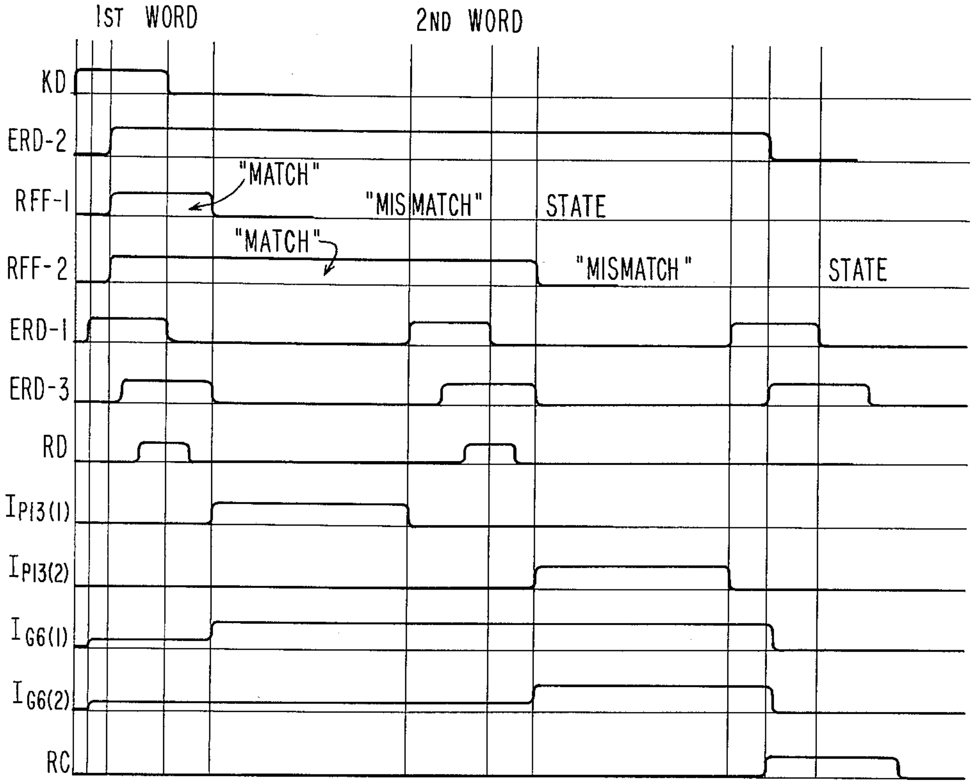

Referring now to FIGURE 4 which shows the complete memory and to FIGURE 5C which is the timing diagram for reading out the memory; it is seen that aftei the key (KD) inputs are applied, a first enable read pulse ERD–1 is applied to terminal 25 which blocks all of the G13 cryotrons damping out any previously stored persistent currents in the G13 loops. Next, a second enable read interrogation pulse ERD–2 is applied to terminal 15. Since all of the G8 cryotrons of a matched word or data location are superconducting, the second enable read interrogation pulse ERD–2 will cause current to flow through all the G8 cryotrons of the matched locations, which in turn blocks the cryotron G10 of the read flip-flops RFF associated with the matched locations, causing these read flip-flops to be set to the "match" state. A portion of the second enable read pulse ERD–2 current will also be bypassed to ground by way of the cryotron G6. Where there is a mismatch location, one or more of the cryotrons G8 associated with the mismatched location will be resistive and all of the current caused by the second enable read pulse ERD–2 will be bypassed to ground through the superconducting cryotron G6 associated with the first bit of the mismatched word location.

Since by design, the persistent current in the memory cells is ½ critical, selection of the word to be read out merely requires the read flip-flop RFF associated with the matched locations to supply a current at least equal to critical through the G9 cryotrons in that location. This current is provided by a third enable read pulse ERD–3 that is applied to terminal 29. The third enable read pulse is directed to the first "matched" location by the read flip-flops in a manner similar to the way the second enable write current pulse EWD–2 was directed by the write flip-flops WFF to the first "available" word or data location. As described previously in conjunction with FIGURE 1, the third enable write pulse will cause the cryotron G9 to go normal, i.e., resistive, if its associated memory cell contains a "one," and cryotron G9 will remain superconducting if the memory cell contains a "zero." Since the third enable read pulse is only applied to one "match" location at a time, all the other G9 cryotrons are superconducting.

The information in the matched location is now read out in parallel by the application of the read pulse RD to terminal 17. The current caused by the read pulse RD is applied simultaneously to each bit position of the memory (which comprises the serially connected G9 cryotrons) by way of the resistors $R_1$. If the cryotron G9 associated with a bit of the matched location being interrogated is superconducting, i.e., indicating a "zero," most of the read pulse RD current passes through the G9 cryotrons of that bit position and the amplifier 41 has no output, which indicates a "zero" in that bit position. If the cryotron G9 is normal, all of the read pulse current will be directed to the corresponding sense amplifier 41. This causes an output from the amplifier 41 which indicates the presence of a "one."

Finally, while the second ERD–2 and third ERD–3 enable read pulses are still present, the first enable read pulse ERD–1 and the read pulse RD are terminated. The current supplied by the third enable read pulse continues through the cryotron G11 of the "matched" location read flip-flop RFF, bypassing the associated cryotron G13 due to the constant flux linkage criterion. The third enable read pulse is next removed, causing a persistent current $I_{p13}(1)$ FIGURE 5C to build up in the cryotron G13 loop of the interrogated "matched" location read flip-flop, which resets the flip-flop to the "mismatch" state, and in turn blocks the cryotron G15 causing the second enable read pulse current to find a superconducting path $I_{G6}(1)$ FIGURE 5C through the cryotron G6 to ground. The second enable read pulse remains on until all of the "matched" locations have been read out.

In order to read out the next "matched" location, the first enable read pulse ERD–1 is again applied to terminal 25, blocking all of the G13 cryotrons. Notice that this will damp out the persistent current $I_{p13}(1)$ induced in the cryotron G13 loop of the last interrogated "matched" location. However, since there can be no net change of flux the read flip-flop associated with the last interrogated "matched" location will remain in the "mismatch" state. Similarly, the ERD–2 current for the word just read out remains bypassed through its associated G6 Gate, even through G15 is again superconducting.

The third enable read pulse ERD–3 is then applied to terminal 29 and is directed to the next "matched" location by the read flip-flops RFF and the read cycle described above is repeated. After all of the matched locations are read out the next application of the third enable read pulse ERD–3 finds all of the read flip-flops in the "mismatch" state. Accordingly, the third enable read pulse will pass through all of the G12 cryotrons of the read flip-flops RFF to the read complete cryotron G17 causing it to go normal. When the read complete cryotron G17 goes normal, a voltage is developed across it which is amplified by the read complete amplifier 42 giving a signal RC that the read out of the memory is completed.

When all of the "matched" locations are read out, all of the second enable read ERD–2 current is flowing through the G6 cryotrons and the second enable read pulse can now be terminated. In order to prevent unwanted persistent currents from building up in the cryotron G6 and G8 loops when the second enable read pulse is terminated, an over-ride pulse (not shown) is applied to the G8 cryotrons of all the first bit positions by way of terminal 16. This over-ride pulse can be the read complete RC output of the read complete amplifier 42. Alternatively, the G6 cryotrons could be made normal. This is why the G6 cryotrons are shown as cryotrons even though they need only be a superconducting inductor for the system described.

If a word or data location contains no stored information, its associated write flip-flop is in the "available" state. The "available" state current will block the cryotron G8 of the first bit location of the unused word or data location. Accordingly, when the second enable read pulse ERD–2 is applied it will find the cryotron G8 normal and the current will flow through the associated cryotron G6 to ground, thus preventing an unused word or data location from appearing as a "match" condition.

Notice that if certain key (KD) inputs receive no input during a read operation, it becomes possible to search for a match in only a portion of a stored word or data location. This is called "masking" or a "don't care" operation. However, during the read out operation the entire word or data position will be read out.

*Selectively clearing the memory*

Figure 5D:
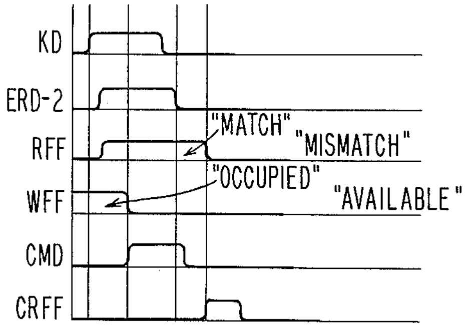

To selectively clear the memory the word or data locations to be cleared are specified by application of the key KD inputs as is shown in FIGURE 5D which is the timing diagram for the selective clear operation. Referring now to FIGURE 5D and FIGURE 4, it is shown that the second enable read pulse ERD–2 is applied to terminal 15 which sets the read flip-flops RFF to the "match" state on those word or data locations matching the key KD inputs. A selective clear pulse CMD is then applied to terminal 26 which passes through the cryotron G16 of the read flip-flops in the "match" state and sets the associated write flip-flops WFF into the "available" state by blocking their G2 cryotrons. The "matched" read flip-flops are then reset to the "mismatch" state by application of the clear read flip-flops pulse CRFF to terminal 28. After all the pulses are terminated, new information may be written into the memory by way of the "available" state write flip-flops WFF.

A complete superconducting cryotron associative memory has been described. Because superconducting circuits generate little or no noise signals even when a large number of them are serially connected, such a memory is ideally suited for very large capacities, i.e., many word locations having a relatively large number of bits may be fabricated. The relative low cost and ease of manufacture of such memories also make sure large capacities feasible.

What I claim is:

1. A superconducting associative memory for simultaneously comparing a plurality of memory words with a key word comprising:

(a) means providing a persistent current memory cell matrix including bit columns and word rows;

(b) superconducting circuit means for setting said word rows of memory cells into persistent current states representing words of data including, (c) a cryotron write flip-flop associated with each said memory cell word row for directing incoming words to be stored in said memory to available word row locations and for bypassing occupied word row locations;

(d) superconducting circuit means for simultaneously detecting all of said word row locations in said associative memory having data that matches said key word and for reading out sequentially in word bit parallel, the contents of such matched word row locations including, (e) a cryotron read flip-flop associated with each memory cell word row location.

2. The combination defined in claim 1 wherein superconducting circuit means is coupled to said read flip-flops to provide an output signal indicative of the end of a matched word sequence read out operation.

3. A superconducting memory for simultaneously comparing a plurality of memory words with a key word comprising:

(a) means providing a persistent current memory cell matrix made up of bit columns and word rows;

(b) superconducting circuit means for setting said word rows of memory cells into persistent current states representing respective words of data including, (c) a cryotron write flip-flop associated with each word row and having an "available" and an "occupied" state for directing incoming words to be stored in said memory to "available" word rows and bypassing "occupied" word rows, (d) persistent current circuit means associated with each of said write flip-flops effective to transfer said write flip-flops from said "available" state to said "occupied" state after information is stored in their associated word rows;

(e) superconducting circuit means for simultaneously detecting all of said word row locations in said associative memory having data that matches said key word and for reading out sequentially in word bit parallel, the contents of such matched word row locations including, (f) a cryotron read flip-flop associated with each memory cell word row and having a "mismatch" and a "match" state, (g) persistent current circuit means associated with each of said read flip-flops effective to transfer said read flip-flops from said "match" state to said "mismatch" state after the information stored in their associated word rows is read out.

4. The combination defined in claim 3 further including means coupling said write flip-flops to a said memory bit cell in their associated word row, said coupling means connected for correspondence between the unoccupied state of said memory row and the "available" state of its associated write flip-flop, to prevent an empty word location from appearing as a match with said key word.

5. A superconducting memory for simultaneously comparing a plurality of memory words with a key word comprising:

(a) means providing a persistent current memory cell matrix made up of bit columns and word rows wherein each persistent current memory cell represents a bit position;

(b) superconducting circuit means for setting said word rows of memory cells into persistent current states representing words of data including, (c) a cryotron write flip-flop associated with the memory cell of each word row and having an "available" state and an "occupied" state, and whereby after information has been written into their associated word rows said write flip-flops being in said "occupied" state and before information is written into their associated word rows, said write flip-flops being in said "available" state, (d) persistent current circuit means associated with each of said write flip-flops to transfer said wire flip-flops from said "available" state to said "occupied" state after information is stored in their associated word rows, (e) superconducting circuit means coupling said write flip-flops together in such a manner that new word data entering the memory will bypass the word row locations in which the said associated write flip-flops are in the said "occupied" state and will seek the first word row having its said associated write flip-flop in said "available" state;

(f) superconducting circuit means commonly connecting corresponding column bit cells in all of said memory words to respective bit cells of said key word for simultaneously detecting of all matching word rows and for sequentially reading out, a word at a time, the contents of said matching word rows.

6. The combination defined in claim 5 further including means coupling each write flip-flop to a said memory bit cell in its said associated word row, said coupling means connected for correspondence between the unoccupied state of said memory word row and the "available" state of its associated write flip-flop, to prevent an empty word location from appearing as a match with said key word.

7. A superconducting memory device for storing data and for detecting a match between the stored data and a key word comprising:

(a) a persistent current memory cell matrix made up of bit columns and word rows wherein each persistent current memory cell represents a bit position;

(b) superconducting circuit means for setting said word rows of memory cells into persistent current states representing words of data;

(c) superconducting circuit means for simultaneously detecting word row locations having data that matches said key word and for reading out sequentially in word bit parallel, the contents of such matched word row locations including, (d) a cryotron read flip-flop associated with each memory cell word row and having a "mismatch" and a "match" state, (e) said read flip-flops being in said "mismatch" state when the information in their associated word row does not match said key word and said read flip-flops being in said "match"state when the information in their associated word row matches said key word, (f) persistent current circuit means associated with each of said read flip-flops effective to transfer said read flip-flops from said "match" state to said "mismatch" state after the information stored in their associated word rows is read out, (g) superconducting circuit means coupling said read flip-flops together in such a manner that only the "matched" word locations will be read out sequentially while the "mismatched" word locations will be bypassed.

8. The combination defined in claim 7 including further superconducting circuit means is coupled to said read flip-flops to provide therefrom an output signal when the last matching word row in the readout sequence undergoes a read out operation.

9. A superconducting memory device for storing data and for detecting a match between the stored data and a key word comprising:

(a) a persistent current memory cell matrix made up of bit columns and word rows wherein each persistent current memory cell represents a bit position;

(b) superconducting circuit means for setting said word rows of memory cells into persistent current states representing words of data including, (c) a cryotron write flip-flop coupled to each word row and providing a first and a second path of current, and whereby after information has been written into its associated word row said write flip-flop having current flowing only in said first path and before information is stored into its associated word row said write flip-flop having current flowing only in said second path, (d) persistent current circuit means associated with each of said write flip-flops effective to transfer the current flow in said write flip-flops from said second path to said first path after information is stored in their associated word rows, (e) superconducting circuit means coupling said write flip-flops in such a manner that new information entering the memory will bypass the word locations whose said associated write flip-flop has current flowing in the said first path and will seek the first word row having current flow in said second path of its said associated write flip-flop;

(f) superconducting circuit means for simultaneously detecting word row locations having data that matches said key word and for reading out sequentially, in bit parallel, the contents of such match word row locations including, (g) a cryotron read flip-flop coupled to each word row providing a first and a second path of current, and whereby when the information in its associated word row does not match said key word said read flip-flop having current flowing in said first path and when the information in its associated word row does match said key word said read flip-flop having current flow in said second path, (h) persistent current means associated with each of said read flip-flops effective to transfer the current flow in said read flip-flops from said second path to said first path after the information stored in their associated word rows is read out, (i) superconducting circuit means coupling said read flip-flops together in such a manner that the matched word row locations will be read out sequentially while the mismatch word row locations will be bypassed during a read out operation.

10. The combination defined in claim 4 wherein superconducting circuit means is coupled to said read flip-flops to provide an output signal therefrom when the transfer of the last matching word row in the readout sequence is completed.

11. The combination defined in claim 9 wherein said second current path of each of said write flip-flops is coupled to a said memory bit cell in its said associated word row to provide correspondence between the unoccupied state of said memory word row and the "available" state of its associated write flip-flop, and thereby to prevent any empty word locations from appearing as a match with said key word.

12. A superconducting memory for simultaneously comparing a plurality of memory words with a key word comprising:

(a) a persistent current memory cell matrix made up of bit columns and word rows wherein each persistent current memory cell represents a bit position;

(b) superconducting circuit means for setting said word rows of memory cells into persistent current states representing respective words of data including, (c) a cryotron write flip-flop associated with each word row and having an "available" and an "occupied" state;

(d) persistent current means associated with each of said write flip-flops to transfer said write flip-flops from said "available" state to said "occupied" state after new information is stored in their associated word rows, (e) superconducting circuit means coupling said write flip-flops in such a manner that new words entering the memory will bypass the word row location having their said associated write flip-flops in said "occupied" state and will be sequentially entered into the word row locations having their said associated write flip-flops in said "available" state;

(f) a plurality of enable write lines each tranversing a word row of said memory cells and terminating in an associated write flip-flop for enabling information to be writen into said word rows;

(g) superconducting circuit means for simultaneously detecting said word row locations having a memory word data matching said key word and for sequentially reading out, in word bit parallel, the contents of said matched word row locations including, (h) a cryotron read flip-flop associated with each word row and having a "mismatch" and a "match" state, (i) persistent current means associated with each of said read flip-flops to transfer said read flip-flops from said "match" state to said "mismatch" state after the information stored in their associated word rows is read out, (j) superconducting circuit means coupling said read flip-flops in such a manner that only the "matched" word locations will be read out sequentially while the "mismatched" word locations will be bypassed;

(k) a plurality of sensing cryotrons each associated with a said memory cell for detecting the data content of said cell;

(l) said sensing cryotrons of each word row being serially connected and terminated in said associated read flip-flop in such a manner that said associated read flip-flop is transferred into its "match" state whenever a match occurs between word data in its associated word row and said key word;

(m) a plurality of read out sense lines each traversing a word row of said memory cells and terminating in an associated read flip-flop.

13. The combination defined in claim 12 wherein a cryotron is coupled to said read flip-flops to provide an output signal therefrom when the transfer of the last matching word row in the readout sequence is completed.

14. A superconducting memory for simultaneously comparing a plurality of memory words with a key word comprising:

(a) a persistent current memory cell matrix made up of bit columns and word rows wherein each persistent current memory cell represents a bit position, (b) each of said memory cells having a write cryotron, a sensing cryotron, a read out cryotron, and a persistent current loop associated with said write cryotron, (c) each of said cryotrons having at least a gate element and at least one control element, (d) a source of information words to be stored in said memory cell word rows and having a plurality of bit positions, (e) a source of read pulses, (f) a source of key words each of which is simultaneously compared with all words stored in said memory cell word rows and having a plurality of bit positions, (g) a cryotron write flip-flop associated with each memory cell word row, (h) a cryotron read flip-flop associated with each memory cell word row, (i) said gate elements of said read cryotron of each bit column being serially coupled to the corresponding bit location of said source of information words and said control elements of said read cryotrons of each word row being serially coupled to their associated said write flip-flop, (j) said gate elements of said sensing cryotrons of each word row being serially coupled to their associated read flip-flop and said control elements of said sensing cryotrons of each bit column being serially coupled to the corresponding bit location of said source of key words, (k) said gate elements of said read out cryotrons of each bit column being serially coupled to said source of read pulses and said control elements of said read out cryotrons of each word row being serially connected to their associated read flip-flop, (l) said persistent current loops of each memory being disposed so as to influence the conductivity of their associated said sensing and read out cryotrons, (m) means including said write flip-flops for setting said word rows of memory cells to persistent current states representing respective words of data, (n) means including said read flip-flops to read out the information in said word rows when that information matches a said key word.

15. A superconducting circuit comprising:

(a) a first, second, third, fourth and fifth cryotron each having a gate element and a control element, (b) the gate elements of said first and second cryotrons being connected in parallel to form first and second stable current paths respectively, (c) the third cryotron having its said control element being connected in series with said first current path, (d) the fourth cryotron having its said control element connected in series with said second current path, (e) the third and fourth cryotrons having one end of their gate elements commonly connected, (f) a persistent current loop coupled to the other end of said gate element of said fourth cryotron, (g) said persistent current loop including said gate element of said fifth cryotron serially connected with said control element of said first cryotron such that a persistent current induced into said persistent current loop by termination of current through the gate of said fourth cryotron will influence the resistivity of said first cryotron, (h) means for applying current to said control element of said second cryotron to control its resistivity.

16. A superconducting memory for simultaneously comparing a plurality of memory words with a key word comprising:

(a) means providing a persistent current memory cell matrix including bit columns and word rows;

(b) superconducting circuit means for setting said word rows of memory cells into persistent current states representing words of data including, (c) a cryotron write flip-flop associated with each said memory cell word row for directing incoming words to be stored in said memory to available word row locations and for bypassing occupied word row locations, (d) said write flip-flops comprising a first, second, third and fourth cryotron each having a gate element and a control element, (e) means connecting the gate elements of said first and second cryotrons in parallel to form first and second stable current paths respectively, (f) means connecting the control element of said third cryotron in series with said second path, (g) said gate element of said third cryotron connected to a closed persistent current loop including said gate element of said fourth cryotron serially connected with said control element of said first cryotron such that a persistent current induced in said persistent current loop by termination of current through said gate element of said third cryotron will influence the resistivity of said first cryotron;

(h) superconducting circuit means for simultaneously detecting word row locations having data that matches said key word and for reading out in word bit parallel, the contents of such matched word row locations including, (i) a cryotron write flip-flop associated with each memory cell word row location.

References Cited by the Examiner

UNITED STATES PATENTS

| | | | |
|---|---|---|---|
| 3,011,711 | 12/1961 | Buck | 235—176 |
| 3,021,439 | 2/1962 | Anderson | 307—88.5 |
| 3,078,445 | 2/1963 | Sass | 307—88.5 |
| 3,093,748 | 6/1963 | Anderson | 307—88.5 |
| 3,093,816 | 6/1963 | Hunter | 307—88.5 |

OTHER REFERENCES

Pages 115–119, December 1956, Slade and McMahon, A Cryotron Catalog Memory System, Proceedings of the Eastern Joint Computer Conference, vol. 10.

ROBERT C. BAILEY, *Primary Examiner.*

MALCOLM A. MORRISON, *Examiner.*